(12) United States Patent
Adachi et al.

(10) Patent No.: US 9,348,413 B2
(45) Date of Patent: May 24, 2016

(54) ELECTRONIC DEVICE

(71) Applicant: Panasonic Corporation, Osaka (JP)

(72) Inventors: Yusuke Adachi, Osaka (JP); Shoichi Araki, Osaka (JP); Yoshifumi Hirose, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 51 days.

(21) Appl. No.: 13/923,535

(22) Filed: Jun. 21, 2013

(65) Prior Publication Data

US 2013/0285910 A1  Oct. 31, 2013

Related U.S. Application Data (63) Continuation of application No. PCT/JP2013/000055, filed on Jan. 10, 2013.

(30) Foreign Application Priority Data

Jan. 17, 2012 (JP) ................. 2012-006708

(51) Int. Cl.
G06F 3/01 (2006.01)
G06F 3/0354 (2013.01)

(52) U.S. Cl.
CPC ............ *G06F 3/016* (2013.01); *G06F 3/03547* (2013.01)

(58) Field of Classification Search
CPC ...................................... G06F 3/043
USPC ........................................ 345/159
See application file for complete search history.

(56) References Cited

U.S. PATENT DOCUMENTS

| | | | |
|---|---|---|---|
| 2005/0156904 A1 | 7/2005 | Katayose | |
| 2006/0109256 A1 | 5/2006 | Grant et al. | |
| 2006/0119586 A1 | 6/2006 | Grant et al. | |
| 2007/0236450 A1* | 10/2007 | Colgate et al. | 345/156 |
| 2008/0296072 A1 | 12/2008 | Takashima et al. | |
| 2009/0251421 A1* | 10/2009 | Bloebaum | 345/173 |

(Continued)

FOREIGN PATENT DOCUMENTS

| | | |
|---|---|---|
| JP | 11-085400 A | 3/1999 |
| JP | 2000-341515 A | 12/2000 |

(Continued)

OTHER PUBLICATIONS

International Search Report for corresponding International Application No. PCT/JP2013/000055 mailed Feb. 26, 2013.

(Continued)

*Primary Examiner* — Alexander Eisen
*Assistant Examiner* — Kebede Teshome
(74) *Attorney, Agent, or Firm* — Renner, Otto, Boisselle & Sklar, LLP (57) ABSTRACT

The electronic device 100 includes a touch panel 102 to be touched by a user, a vibrating section 203 for vibrating the touch panel 102, a vibration control section 301 for controlling the vibration of the vibrating section 203, and a display section 101 for displaying an image. The vibration control section 301 changes the vibration of the vibrating section 203 in accordance with a speed at which the user performs a swiping operation on the touch panel 102 and a spatial frequency in a swiping direction of an image displayed at a position where the user is performing a swiping operation.

10 Claims, 8 Drawing Sheets

(56) References Cited

U.S. PATENT DOCUMENTS

| | | | |
|---|---|---|---|
| 2009/0262091 A1* | 10/2009 | Ikeda et al. | 345/173 |
| 2010/0238108 A1* | 9/2010 | Rekimoto | 345/156 |
| 2012/0194460 A1* | 8/2012 | Kuwabara et al. | 345/173 |

FOREIGN PATENT DOCUMENTS

| | | | |
|---|---|---|---|
| JP | 2003-316519 A | 11/2003 | |
| JP | 2005-284416 A | 10/2005 | |
| JP | 2006-001498 A | 1/2006 | |
| JP | 2006-163460 A | 6/2006 | |
| JP | 2008-516348 A | 5/2008 | |
| JP | 2011-048846 A | 3/2011 | |

OTHER PUBLICATIONS

Form PCT/ISA/237 for corresponding International Application No. PCT/JP2013/000055 dated Feb. 26, 2013 and partial English translation.

* cited by examiner

ELECTRONIC DEVICE

This is a continuation of International Application No. PCT/JP2013/000055, with an international filing date of Jan. 10, 2013, which claims priority of Japanese Patent Application No. 2012-006708, filed on Jan. 17, 2012, the contents of which are hereby incorporated by reference.

BACKGROUND

1. Technical Field

The present disclosure relates to an electronic device that can be operated by a user.

2. Description of the Related Art

In recent years, electronic devices having a touch panel as an input means have been widely used. One of the operation principles of the touch panel is the capacitive type. With this type, a touch position of a fingertip of the user on the touch panel is detected by sensing a change in the capacitance between the fingertip of the user and a conductive film of the touch panel.

Typically, with an electronic device including a touch panel, an input operation is performed by the user directly contacting the touch panel surface. A touch panel with a tactile sensation function has been proposed in the art, in which vibrating sections are provided on a touch panel in order to provide a feel in accordance with a touch panel operation, thereby presenting a vibrating tactile sensation to the user. For example, there are cameras where a slide button is provided on a side surface of the body for performing a zoom operation, and Japanese Laid-Open Patent Publication No. 2005-284416 discloses a camera in which an elongate touch panel is provided on a side surface of the body and the touch panel is used as such a slide button. When a user performs a zoom operation by performing a swiping operation on the elongate touch panel, a vibration is varied depending on the swiping speed, thereby allowing the user to feel a tactile sensation corresponding to an operation feel of a mechanical slide button.

SUMMARY

The present disclosure provides an electronic device, in which when a user performs a swiping operation on an image displayed on a display section, a tactile sensation in accordance with the displayed image is presented to the user.

An electronic device according to an embodiment of the present disclosure includes a panel touched by a user; a vibrating section for vibrating the panel; a vibration control section for controlling the vibration of the vibrating section; and a display section for displaying an image. The vibration control section changes the vibration of the vibrating section in accordance with a speed at which the user performs a swiping operation on the panel and a spatial frequency in a swiping direction of an image displayed at a position where the user is performing a swiping operation.

With an electronic device according to an embodiment of the present disclosure, when a swiping operation is performed on an image displayed on the display section, a tactile sensation in accordance with the displayed image can be presented to the user.

DETAILED DESCRIPTION

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

1. Configuration of Electronic Device

Figure 1:
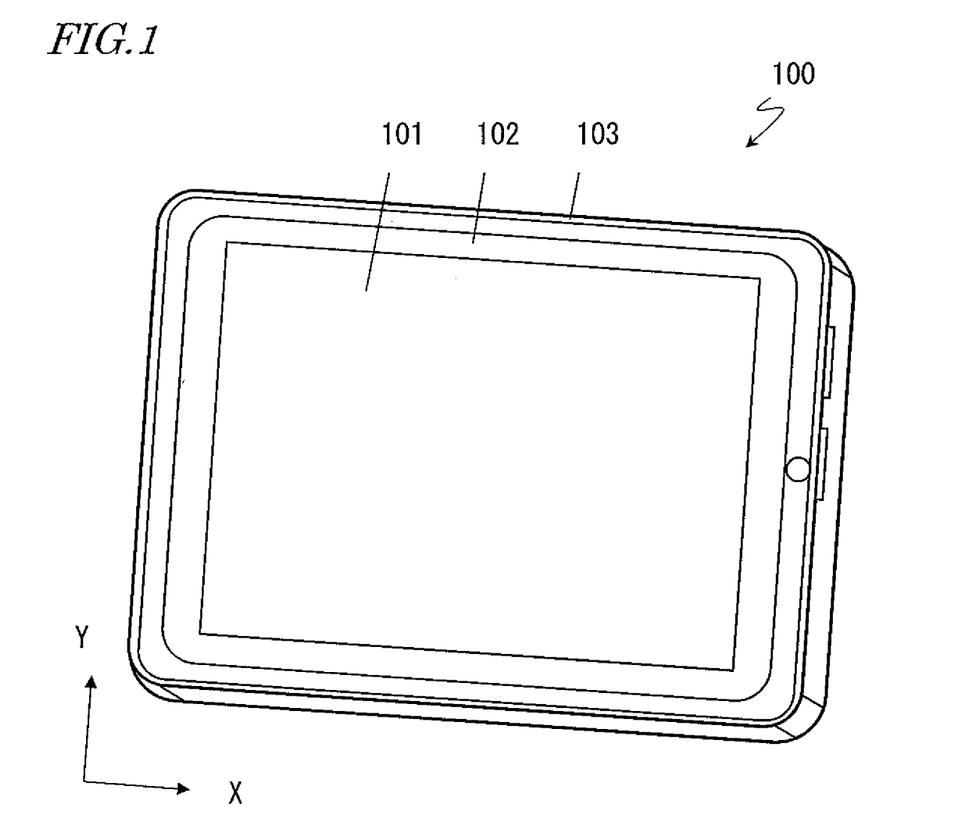
FIG. 1 is an external perspective view of an electronic device according to an embodiment.

FIG. 1 is a perspective view showing an external view of the display surface side of an electronic device 100 according to an embodiment. The electronic device 100 includes a display section 101, a touch panel 102 arranged so as to cover the display section 101, and a casing 103. For the purpose of illustration, the long-side direction of the touch panel 102 will be referred to as the X direction, and the short-side direction thereof as the Y direction.

Figure 2:
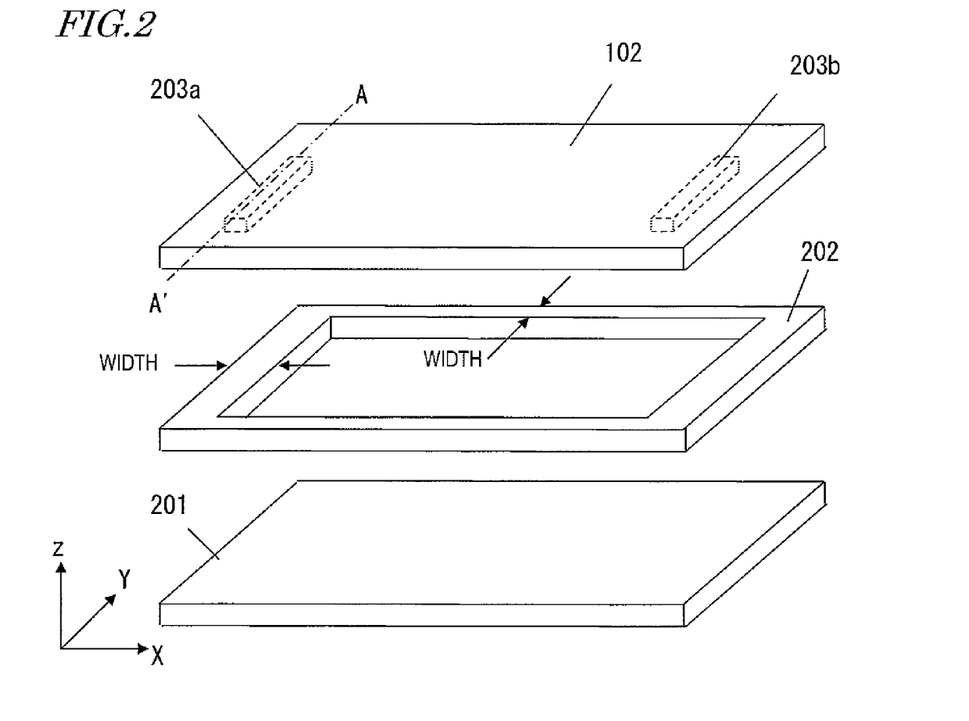
FIG. 2 is an exploded perspective view showing an electronic device according to an embodiment.

FIG. 2 is an exploded perspective view showing the electronic device 100. As shown in FIG. 2, the electronic device 100 includes a base material 201, the touch panel 102, a support section 202, and a vibrating section 203. The base material 201 is a member to be the base for supporting the touch panel 102. The base material 201 is a metal, a resin, or the like, having such a rigidity that it can support the touch panel 102, etc. A display panel and a circuit board, which are not shown, are attached to the base material 201.

The touch panel 102 accepts a touch operation by the user to detect a touch position. The method of position detection of the touch panel 102 may be any of known methods, such as pressure-sensitive, capacitive, optical, and surface acoustic wave. The touch panel 102 is an example of a panel member. A circumferential portion of the touch panel 102 is supported by the support section 202.

The support section 202 is provided along substantially the entire circumferential portion of the touch panel 102, and supports the touch panel 102 against the base material 201. The support section 202 is formed by a material having some strength and elastic force, such as a resin, a rubber or a gel. The support section 202 may be formed by a metal, or the like. With such a configuration, it is possible to increase the strength of the support section 202. The support section 202 may be formed by a spring element. With such a configuration, the support section 202 can have a high elastic force.

The support section 202 is formed by four sides. Specifically, it is formed by two opposing long sides and two opposing short sides in conformity with the shape of the electronic device 100. The width of the support section 202 is narrower along the long sides than along the short sides. As a result, the rigidity of the support section 202 is lower along the long sides than along the short sides.

Note that while the base material 201 and the support section 202 are provided as separate members in the present embodiment, the base material 201 and the support section 202 may be formed as an integral member.

While the support section 202 connects together the base material 201 and the touch panel 102 along the entire circumference in the present embodiment, it may be along parts of the circumference.

The electronic device 100 of the present embodiment includes two vibrating sections 203a and 203b. The vibrating sections 203a and 203b are attached to circumferential portions on the reverse surface of the touch panel 102. The vibrating sections 203a and 203b are each arranged in the vicinity of generally the middle point of a short side of the touch panel 102. The vibrating sections 203a and 203b vibrate the touch panel 102 to give a tactile sensation to the user. For example, the vibrating sections 203a and 203b may be piezoelectric elements, vibration motors, linear actuators, voice coil motors, artificial muscles, or the like. In essence, the vibrating sections 203a and 203b may be any portions capable of converting an electric energy, or the like, into a vibration energy.

Figure 3:
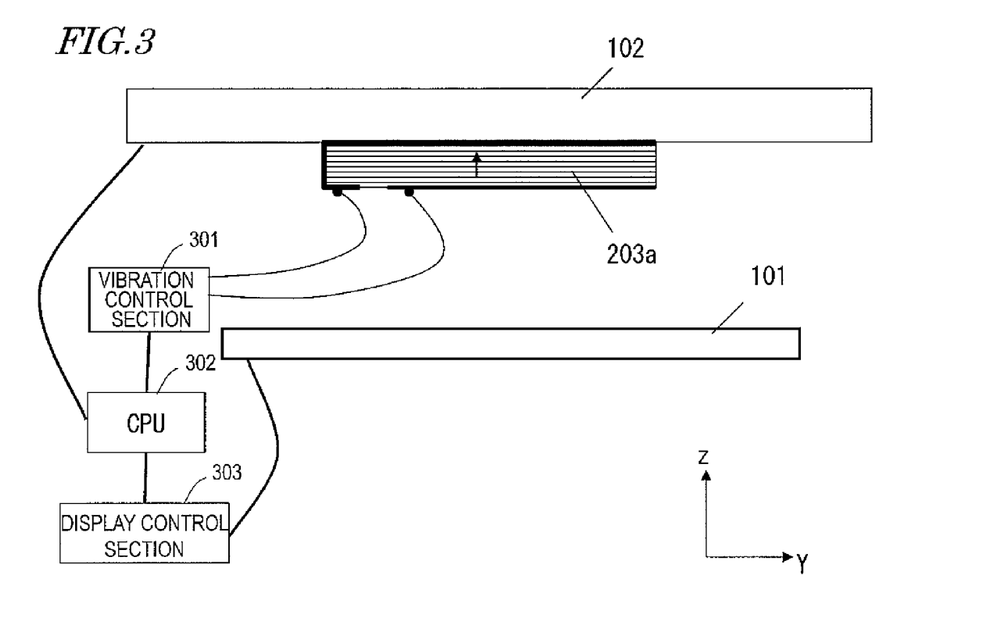
FIG. 3 is a cross-sectional view of an electronic device according to an embodiment taken along line A-A' shown in FIG. 2.

FIG. 3 is a cross-sectional view of the touch panel 102 and the vibrating section 203a of the electronic device 100 taken along line A-A' shown in FIG. 2. As shown in FIG. 3, the vibrating section 203a is physically connected to the touch panel 102. The vibrating section 203a is electrically connected to a vibration control section 301. In this example, the vibrating section 203a is a piezoelectric element with electrodes formed on both surfaces thereof. The electrode on the side connected to the touch panel 102 is electrically connected to the vibration control section 301 via the end face of the piezoelectric element. By applying an alternating-current voltage by means of the vibration control section 301, the vibrating section 203a expands and contracts, thereby causing a flexural vibration on the touch panel 102.

Note that as the vibrating section 203, a thin-film transparent piezoelectric member may be formed on the touch panel 102 by a method such as sputtering and used as the vibrating section 203. The vibrating sections 203 may be arranged in any part of the electronic device 100; for example, where there is a cover member on the touch panel 102, the vibrating sections 203 may be attached to the cover member. Note that where there is a cover member on the touch panel 102, a panel member for detecting a touch position includes both the touch panel 102 and the cover member.

While the touch panel 102 and the display section 101 are separate elements in this example, the touch panel 102 and the display section 101 may be formed as an integral member. For example, an in-cell type touch panel may be employed where the touch panel function is integrated inside a liquid crystal panel, or an on-cell type touch panel may be employed where the touch panel function is integrated on the surface of a liquid crystal panel.

A CPU 302 is electrically connected to the vibration control section 301, the touch panel 102, and a display control section 303. The CPU 302 includes a microcomputer, a storage section, etc. The CPU 302 controls operations of various components of the electronic device 100, and performs various detection operations and various determination operations. The CPU 302 displays an image on the display section 101 via the display control section 303. The CPU 302 detects the touch position of the user on the touch panel 102, and performs a calculation therein to output a drive waveform to the vibration control section 301.

The vibration control section 301 changes the vibration of the vibrating sections 203a and 203b in accordance with the speed at which the user performs a swiping operation on the touch panel 102 and the spatial frequency in the swiping direction of an image displayed at the position where the user is performing a swiping operation. The vibration control section 301 changes the vibration amplitude or the phase of the drive waveform of the vibrating section in accordance with the touch position of the user. The operation of the electronic device 100 will now be described in greater detail.

2. Vibration of Touch Panel (Basic Mode)

Figure 4:
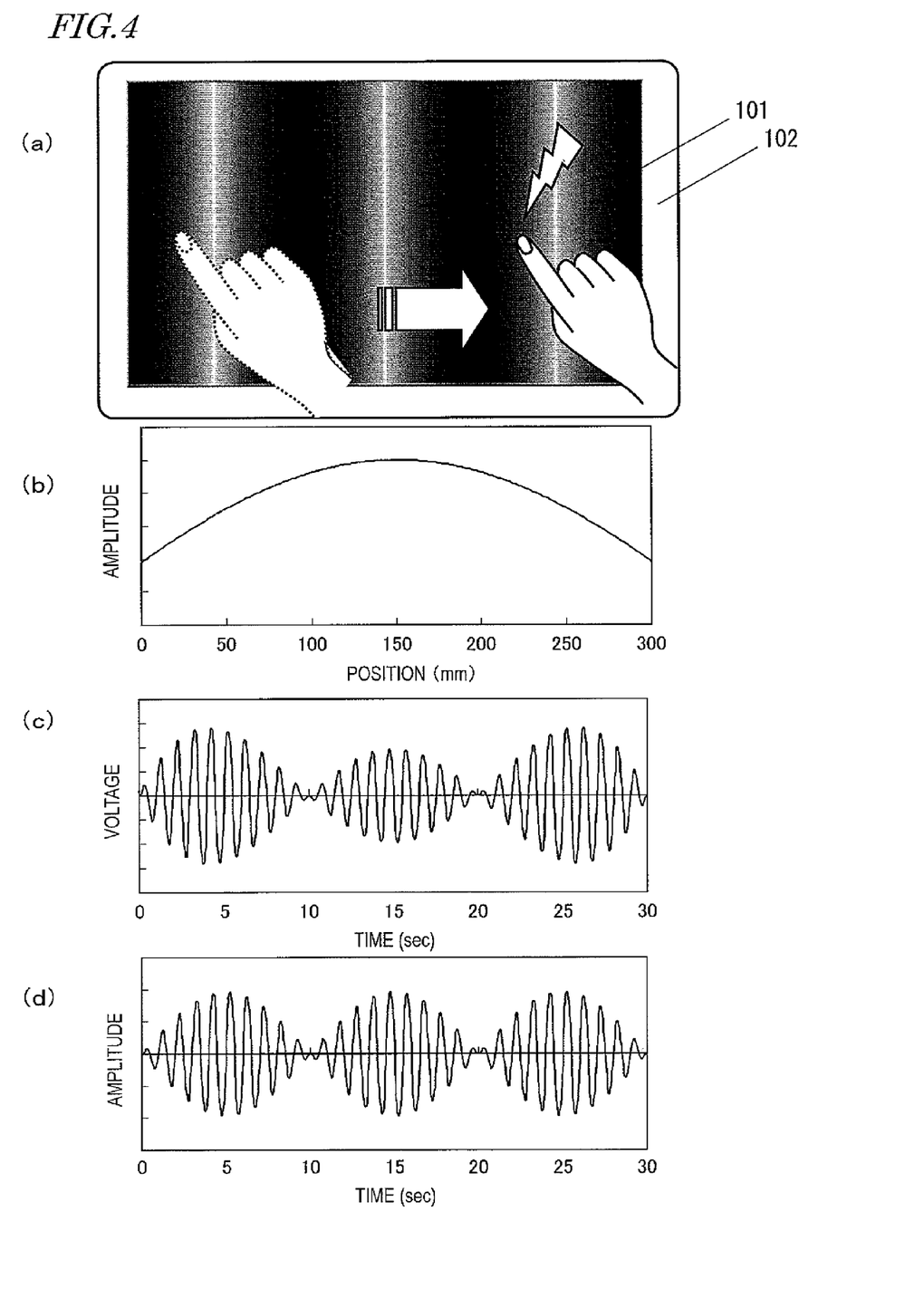
FIG. 4(a) is a plan view showing a display section of an electronic device according to an embodiment.
FIG. 4(b) is a vibration distribution map when driven at a certain frequency.
FIG. 4(c) is a drive waveform diagram when a finger is moved at a uniform speed of 10 mm/s.
FIG. 4(d) is a vibration waveform diagram at the position of a finger of a user.

FIG. 4(a) is a plan view of the display section 101 of the electronic device 100. In an example shown in FIG. 4(a) for illustrating the operation of the electronic device 100 in an easy-to-understand manner, an image of black and white stripes is displayed on the display section 101. In this example, it is assumed that white portions in the image displayed on the display section 101 have a higher brightness and black portions have a lower brightness. The user performs a swiping operation on the touch panel 102 where an image is displayed. The CPU 302 obtains, from the touch panel 102, touch positions of the user on the touch panel 102 at regular intervals. The CPU 302 changes the vibration waveform of the vibrating sections 203a and 203b in accordance with the content of the image and the touch position information, and presents, to the user, a tactile sensation in accordance with the image. In this example, the spatial frequency is a frequency corresponding to the cycle with which the brightness of the image displayed on the display section 101 changes. In this case, the vibration control section 301 varies the amplitude or the frequency of the vibration between high-brightness areas and low-brightness areas, for example. For example, the amplitude is increased and the frequency is increased in a high-brightness area than in a low-brightness area. The spatial frequency may be a frequency corresponding to the cycle with which the color of the image displayed on the display section 101 changes. In this case, the vibration control section 301 varies the amplitude or the frequency of the vibration between areas of the image of different colors, for example. For example, the amplitude is increased and the frequency is increased in a red area than in a blue area.

FIG. 4(b) is a vibration distribution of the touch panel 102 when the touch panel 102 is driven with a certain constant frequency. Under this condition, the magnitude of vibration felt by the user varies depending on the touch position, with such a vibration distribution that the vibration amplitude is larger in a central portion of the touch panel 102 and smaller in end portions.

FIG. 4(c) is a drive waveform applied to the vibrating section 203 when the user performs a swiping operation on the touch panel 102 from the left end to the right end of the figure at a constant speed of 10 mm/s. Using the fundamental frequency as the carrier, modulation is done in accordance with the image information and the swiping speed. The carrier is set to a frequency (e.g., 50 to 500 Hz) felt by the user. Note that while a wave of 1 Hz is illustrated in the figure so that it is easy to understand that the carrier is a sinusoidal wave, the actual frequency is 50 to 500 Hz, for example. Shown below is Arithmetic Expression (1) of drive waveform Volt(t) for presenting, to the user, a tactile sensation in accordance with the image information.

$$\text{Volt}(t) = A \cdot D(p(t)) \cdot (1 + \sin(2\pi \cdot fm(t) \cdot t + \delta m))/2 \cdot \sin(2\pi \cdot fc \cdot t + \delta c) \quad (1)$$

where
A: Constant specifying relative magnitude of vibration
D(p(t)): Correction term for correcting vibration distribution of touch position p(t)
fm(t): Frequency [Hz] of modulated wave
fm(t)=v(t)*v(t)
  v(t): Spatial frequency [lines/m] in swiping direction of image in vicinity of touch position p(t)
  v(t): Swiping speed [m/s] v(t)=(p(t)−p(t−tc))/tc
    p(t): Touch position [m] of user at time t
    tc: Time interval [s] with which CPU obtains touch position
δm: Term for correcting phase of modulated wave
fc: Frequency [Hz] of carrier
δc: Term for correcting phase of carrier The CPU 302 obtains the touch position p(t) of the user on the touch panel 102 at time t. Then, before time t+tc, the CPU 302 calculates the drive waveform from time t+tc to time t+2tc by Arithmetic Expression (1), and transmits the data to the vibration control section 301. The vibration control section 301 vibrates the vibrating section 203 according to the drive waveform from time t+tc to time t+2tc. Thus, it is possible to present, to the user, a rough feel in accordance with the image.

A delay of about 2tc may occur between the actual touch position p(t) and the vibration waveform, the value of tc may be decreased as much as possible, e.g., 100 ms or less, or 20 ms or less.

The CPU 302 may adjust the phase correction term for the carrier and that for the modulated wave so that the waveform at time t+tc calculated based on information at time t and the waveform at time t+tc calculated based on information at time t+tc are continuously connected with each other.

The phase correction term for the modulated wave may be adjusted in accordance with the start position of the swiping operation by the user. For example, the phase difference is set to be small when the swiping operation is started from a high-brightness position in the image displayed on the display section 101, whereas the phase difference is set to be large when the swiping operation is started from a low-brightness position. Thus, positions of the image where the brightness is high can be matched with positions where the amplitude of vibration is large, and it is therefore possible to present a more realistic tactile sensation.

D(x) is a term for correcting the vibration distribution at touch position x. D can be defined as follows where d(x) is the amplitude at touch position x when a predetermined frequency and a predetermined voltage are applied, and d(p(min)) is the amplitude at position p(min) on the touch panel 102 where the amplitude is smallest.

$$D(x) = d(p(\min))/d(x) \quad (2)$$

Note however that where D(x) can be excessively small, a lower limit value may be provided so that D(x) will not be less than or equal to a certain value. For example, it may be 0.3 where D(x)<0.3.

The CPU 302 may calculate the spatial frequency λ(t) and the drive waveform from the content of the image in the swiping direction over a range of about 1 to 5 cm around touch position p(t). While the image to be calculated is assumed to be centered about touch position p(t), it may be p(t)+v(t)·tc or p(t)+v(t)·2·tc further taking the swiping direction into consideration.

The range of the image over which the spatial frequency is calculated may be changed in accordance with the swiping speed of the user. For example, the range of the image over which the spatial frequency is calculated may be increased when the swiping speed of the user is faster than when it is slower. Where the range over which the spatial frequency is calculated is increased, a range greater than or equal to v(t)·tck may be calculated, for example. The spatial frequency is calculated based on brightness or color information, for example. The spatial frequency may be calculated while each pair of white and black is considered as one line.

While an image of simple black-and-white stripes has been illustrated, similar effects can be obtained by calculating the drive waveform by Arithmetic Expression (1) from the image information around the touch position at each point in time, even with a color image, a non-regular pattern, a picture, or a drawing.

While a still image has been illustrated as the image, the image may be a video, and the spatial frequency may be calculated based on the image information of the video at time t or at a point in time ahead of time t by the time lag.

While the touch position, the swiping speed, etc., have been described in one dimension, similar effects can be obtained also in two dimensions.

Where the swiping speed of the user is greater than or equal to a certain speed, it may be determined that no swiping operation is being performed, and the output of the drive waveform may be stopped. For example, where the touch position of the user does not change, the vibration control section does not need to vibrate the vibrating section.

Sound, heat, the brightness of the screen, the image, etc., may be changed with one another according to the drive waveform.

While one spatial frequency of the highest contrast is extracted from the image and reflected in the drive waveform in this example, a spatial frequency of a contrast other than the highest contrast may be used by providing a limitation with a particular color or frequency range depending on a tactile sensation to be expressed. That is, when calculating the spatial frequency v(t), filtering by color, limitation of frequency, limitation of amplitude or direction may be added. This increases the variation of tactile sensations. One may synthesize a plurality of v(t), rather than only a single v(t), in which case a more complicated tactile sensation can be presented.

FIG. 4(d) is a vibration waveform around a finger of the user where the user swipes the finger on the touch panel 102 at 10 mm/s. Since the touch position of the user is at a position of 10x mm after x seconds, the user can therefore feel a rough tactile sensation in accordance with the image signal.

3. Vibration of Touch Panel (Higher-Order Mode)

Figure 5A:
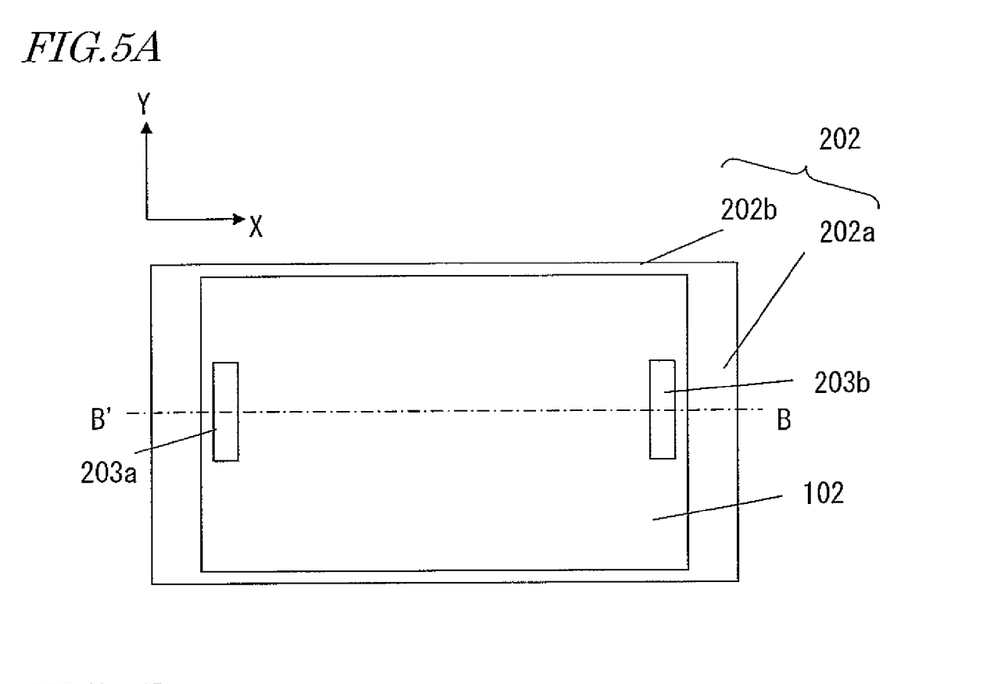
FIG. 5A is a plan view showing a display section of an electronic device according to an embodiment.

FIG. 5A is a plan view of the display section 101 of the electronic device 100. The support section 202 includes a support section 202b extending in the X direction, and a support section 202a extending in the Y direction. The rigidity of the support section 202b in the X direction is lower than the rigidity of the support section 202a in the Y direction.

Figure 5B:
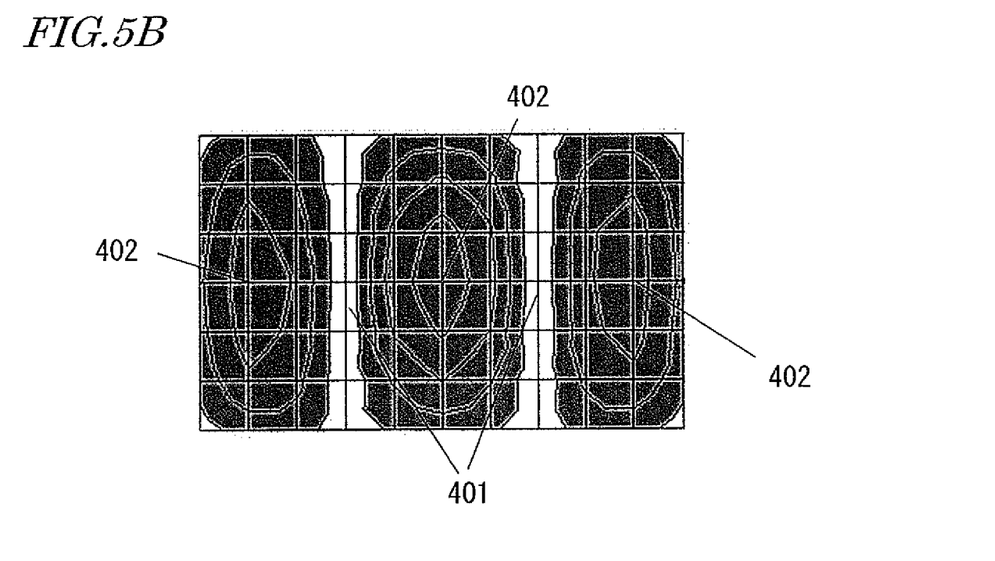
FIG. 5B is a vibration distribution map of a touch panel when an electronic device according to an embodiment is driven at a certain frequency.

FIG. 5B shows a vibration distribution on the touch panel 102 when sinusoidal waves of a voltage of 150 Vpp and a frequency of 220 Hz are applied in phase to the piezoelectric elements of the vibrating sections 203a and 203b via the vibration control section 301. The magnitude of the amplitude of the vibration is represented by contour lines. In the X direction, there are three locations of a large amplitude (hereinafter "vibration antinodes 402") and two locations of a small amplitude (hereinafter "vibration nodes 401") excluding the opposite end portions. In the Y direction, there is no vibration node 401 except for the opposite end portions. Such a vibration mode is referred to as f20 (the first figure attached to f is the number of nodes in the X direction, and the second figure attached thereto is the number of nodes in the Y direction). In the present embodiment, since the support section 202 is formed along the entire circumference, the touch panel 102 will have a flexural vibration with both ends fixed. Note that a vibration other than a flexural vibration with both ends fixed may be used.

Figure 5C:
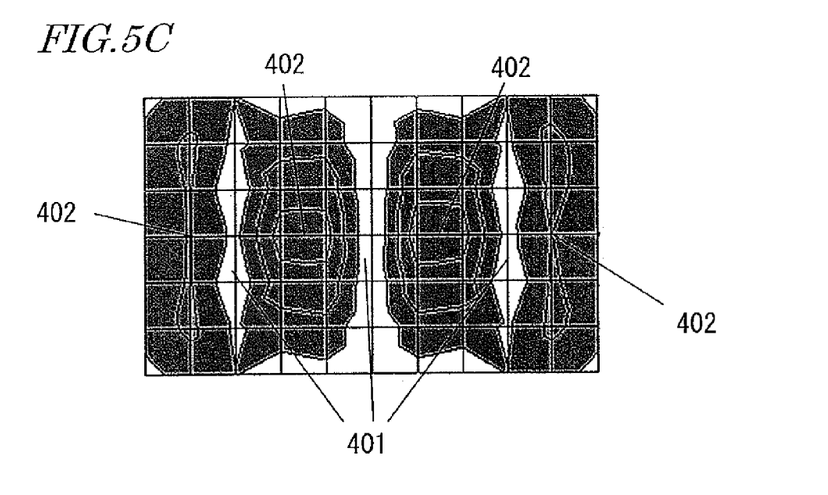
FIG. 5C is a vibration distribution map of a touch panel when an electronic device according to an embodiment is driven at another frequency.

FIG. 5C shows a vibration amplitude on the touch panel 102 when sinusoidal waves of a voltage of 150 Vpp and a frequency of 370 Hz are applied in antiphase to the piezoelectric elements of the vibrating sections 203a and 203b via the vibration control section 301. Herein, antiphase refers to the vibration control section 301 performing a control such that the vibrating section 203b contracts when the vibrating section 203a expands, for example. Specifically, reverse voltages are applied to the piezoelectric elements. In such a case, there are four vibration antinodes 402 and three vibration nodes 401 in the X direction. Such a vibration mode is referred to as the f30 mode.

Figure 5D:
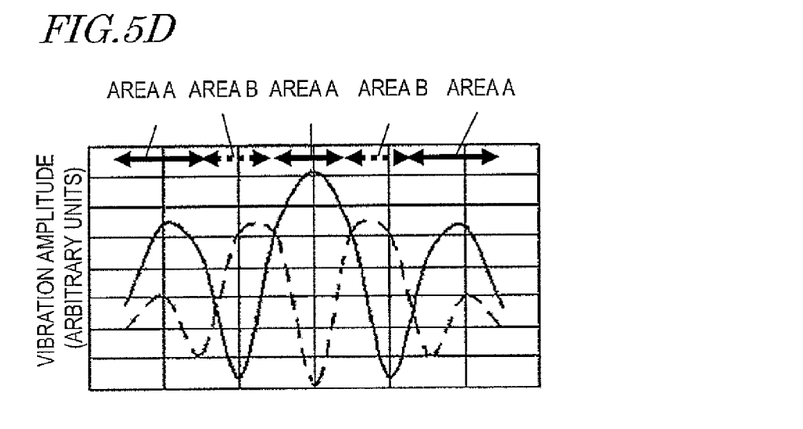
FIG. 5D is a vibration intensity diagram of a touch panel of an electronic device according to an embodiment taken along line B-B' shown in FIG. 5A.

FIG. 5D shows a vibration amplitude distribution along line B-B' of FIG. 5A. The solid line represents the f20 mode, and the dotted line represents the f30 mode. The vibration control section 301 controls the vibration waveform in accordance with the touch position of the user. Specifically, when the touch position of the user is within a range of area A of FIG. 5D, the vibration control section 301 outputs a vibration waveform so as to induce the f20 mode on the vibrating section 203. When the touch position of the user is within a range of area B of FIG. 5D, the vibration control section 301 outputs a vibration waveform so as to induce the f30 mode on the vibrating section 203. Thus, the user can feel a vibration wherever the user touches on the touch panel 102.

Figure 5E:
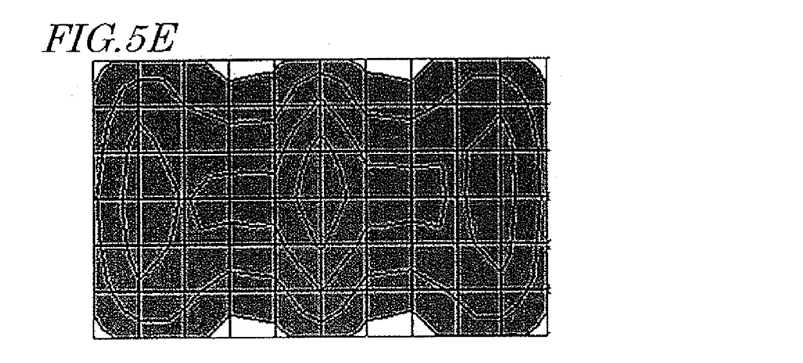
FIG. 5E is a vibration distribution map where a drive frequency is changed depending on the touch position in an electronic device according to an embodiment.

FIG. 5E is a vibration distribution map where the drive frequency is changed depending on the touch position of the user. Since one of the f20 mode and the f30 mode that has a greater vibration at the touch position of the user is output, it is possible to present, to the user, a great vibration across the entire area of the touch panel 102.

While two vibration modes are used in the present example, the present invention is not limited thereto. That is, more then two vibration modes may be used. In such a case, for example, one of the plurality of vibration modes that gives the greatest vibration at the touch position is used.

When selecting vibration modes to be used, frequencies may be selected that are easily felt and not easily heard by a human, in addition to considering the uniformity of vibration. Frequencies that are easily felt as a tactile sensation by a human are 100 to 500 Hz, more specifically 200 to 400 Hz. Since noise may occur due to the vibration of the panel if the frequency is over 500 Hz, a frequency of 500 Hz or less, e.g., 400 Hz or less, is used. Where a plurality of vibration modes are switched from one to another, if the drive frequencies are excessively different from one another, there will be awkwardness in tactile sensation, and therefore one may use drive frequencies close to one another. Note that if the frequency and the voltage are set so that the amplitude on the touch panel 102 is about 5 to 50 μm, it is possible to present a comfortable tactile sensation (vibration) to a finger of a human.

The position at which a vibrating section 203 is arranged on the touch panel 102 is, for example, a location where the vibration amplitude is large in the vibration mode used by the touch panel 102. In the case of FIG. 5B, although one may provide vibrating sections 203 at three locations which are the vibration antinodes, the vibrating sections 203 are not normally transparent, and it blocks the display of the display section 101 on the reverse side if it is arranged in the central portion of the touch panel. Therefore, the vibrating sections 203 are arranged at the end portions of the touch panel 102. For example, they are each arranged outside the display area of the display section 101 and in the range of the touch panel 102. Note that although the vibrating sections 203 have been described to be arranged at the end portions of the touch panel 102, they can be arranged, with no problems, slightly inside the end portions as long as they are outside the display area. Also in such a case, they can be arranged at end portions closer to vibration antinodes. It is possible that the vibrating sections 203 are arranged in the central portion of the touch panel 102 in the Y direction and at the end portions thereof in the X direction (the arrangement of FIG. 5A), or arranged at three locations close to the vibration antinodes in the X direction and at the end portions of the touch panel 102 in the Y direction.

Also with the arrangement positions of the vibrating sections 203 for the f30 mode, the vibrating sections 203 may be arranged close to the positions of the antinodes of vibration amplitude. Therefore, it is possible that they are arranged in the central portion of the touch panel 102 in the Y direction and at the end portions thereof in the X direction, or at four locations on the touch panel 102 close to vibration antinodes in the X direction and at the end portions in the Y direction.

In this example, the f20 mode and the f30 mode are switched from one to another depending on the touch position. Since it is desirable, in view of the cost, to generate vibrations with as few vibrating sections 203 as possible, the vibrating sections 203 are arranged in the central portion of the touch panel 102 in the Y direction and at the end portions thereof in the X direction (the arrangement of FIG. 5A), which is suitable for both vibration modes.

While the example above is a configuration with fewest vibrating sections 203, the vibrating sections 203 may be provided at more than two locations. The vibrating sections 203 may be arranged both in the central portion in the Y direction and in the central portion in the X direction. They may be arranged at asymmetric positions, instead of symmetric positions, as long as they are arranged at portions as close as possible to antinodes of the mode of vibration.

Where amplitudes in antiphase are induced as shown in FIG. 5C, the drive phase needs to be changed depending on the locations where the vibrating sections 203 are arranged. Specifically, where the vibrating sections 203 are arranged left and right in the X direction, the vibrating sections 203 are driven in antiphase (one is contracted while the other expands).

Table 1 shows drive conditions for different touch positions.

TABLE 1

| Drive condition | Condition A | Condition B |
|---|---|---|
| Touch position | area A | area B |
| Frequency | 220 Hz | 370 Hz |
| Burst interval | 250 ms | 250 ms |
| Number of waves | 5 shots | 9 shots |
| Voltage | 150 V | 150 V |
| Phase | in phase | antiphase |

The actual operation will be described in detail using the table and the figure. The user touches the touch panel 102. Referring to values shown in Table 1 based on FIGS. 5B and 5C, the CPU (microcomputer) 302 sends a drive condition to the vibration control section 301 so that a uniform tactile sensation is presented to the user, depending on the touch position. The drive condition includes at least one of the drive voltage, the drive frequency, the phase, the waveform, the output timing, etc., for each of the vibrating sections 203a and 203b. The vibration control section 301 drives the vibrating sections 203 based on information from the microcomputer to present a tactile sensation to the user. Specifically, they are driven under condition A when the touch position touches area A of FIG. 5D, and under condition B when it touches area B.

While the voltage is constant in this example, a uniform tactile sensation may be presented by further dividing each area and adjusting the voltage. The voltage may be set so as to achieve tactile sensations of the same strength in accordance with the frequency characteristics of a human tactile sensation, instead of setting it so as to achieve the same amplitude for condition A and for condition B. Where a burst drive is used to give a clicking feel, the number of shots may be adjusted so as to achieve the same drive time.

Figure 5F:
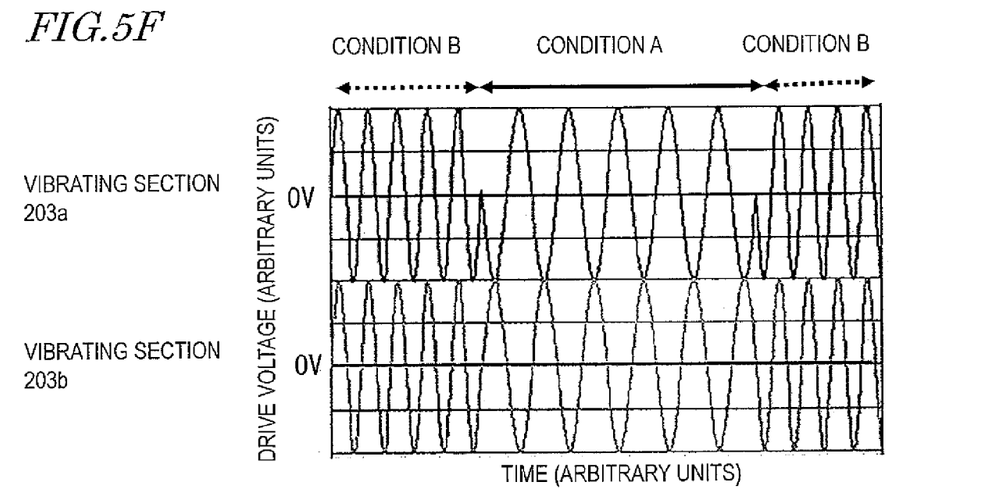
FIG. 5F is a diagram showing drive waveforms for a continuous driving operation in which a finger touching a touch panel of an electronic device according to an embodiment moves continuously while touching the touch panel.

FIG. 5F shows a drive waveform for a continuous drive where a finger, which is continuously touching the touch panel 102, moves thereon. Then, the drive waveform actually output from the vibration control section 301 is adjusted so that the drive waveform changes continuously so that the user will not feel awkward. For example, when changing the drive condition from condition A to condition B when moving from area A to area B of FIG. 5D, the change is made aiming for a point in time when the output voltage is 0. In other words, parameters such as the amplitude, the frequency and the phase are changed at the zero-crossing point of the drive waveform. Thus, it is possible to prevent the user from feeling awkward and to prevent noise.

Figure 6:
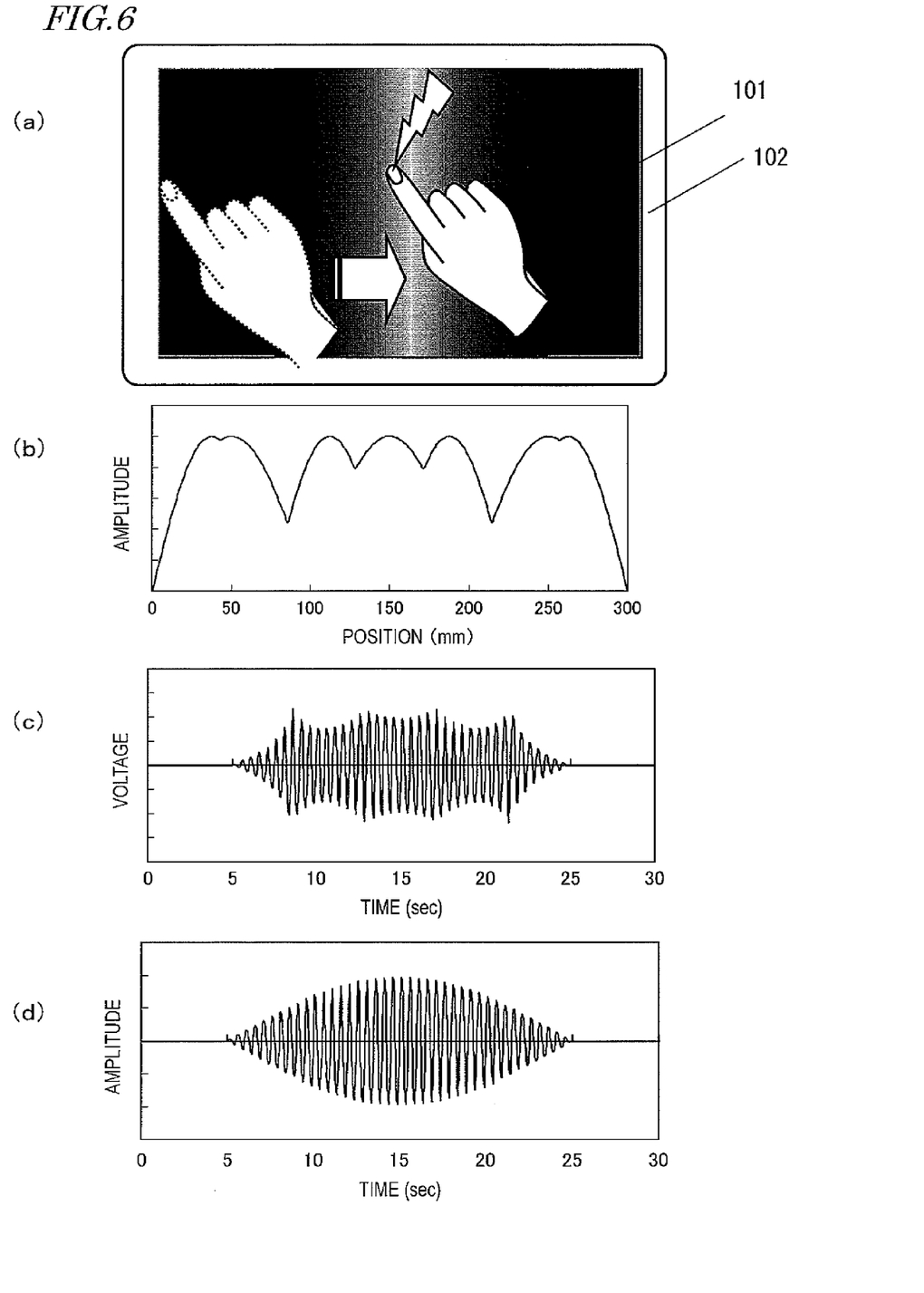
FIG. 6(a) is a plan view showing a display section of an electronic device according to an embodiment.
FIG. 6(b) is a vibration distribution map when driven in a higher-order mode.
FIG. 6(c) is a drive waveform diagram when a finger is moved at a uniform speed of 10 mm/s.
FIG. 6(d) is a vibration waveform diagram at the position of a finger of a user.

FIG. 6(a) is a plan view of the display section 101 of the electronic device 100. An image is displayed on the display section 101. The user touches and performs a swiping operation on the touch panel 102 on the display section 101 where the image is displayed. The CPU 302 obtains, from the touch panel 102, touch positions of the user on the touch panel 102 at regular intervals. The CPU 302 controls the vibration waveform based on the image and the touch position information to present, to the user, a tactile sensation in accordance with the image.

FIG. 6(b) shows a vibration distribution of the touch panel 102 when the vibrating section 203 is driven while switching between a plurality of higher-order modes. Under this condition, the magnitude of vibration felt by the user varies depending on the touch position, thus giving a complicated vibration distribution.

FIG. 6(c) is a drive waveform applied to the vibrating section 203 when the user performs a swiping operation on the touch panel 102 from the left end to the right end of the figure at a constant speed of 10 mm/s. Using the fundamental frequency as the carrier, modulation is done in accordance with the image information and the swiping speed. The carrier is set to a frequency felt by the user, e.g., 50 to 500 Hz. Note that while a wave of 1 Hz is illustrated in the figure so that it is easy to understand that the carrier is a sinusoidal wave, it is actually 50 to 500 Hz, for example. The CPU 302 calculates the drive waveform using Arithmetic Expression (1) based on the touch position of the user and the image information.

FIG. 6(d) is a vibration waveform around a finger of the user where the user swipes the finger at 10 mm/s. Since the touch position of the user is at a position of 10x mm after x seconds, the user can therefore feel a rough tactile sensation in accordance with the image.

Figure 7:
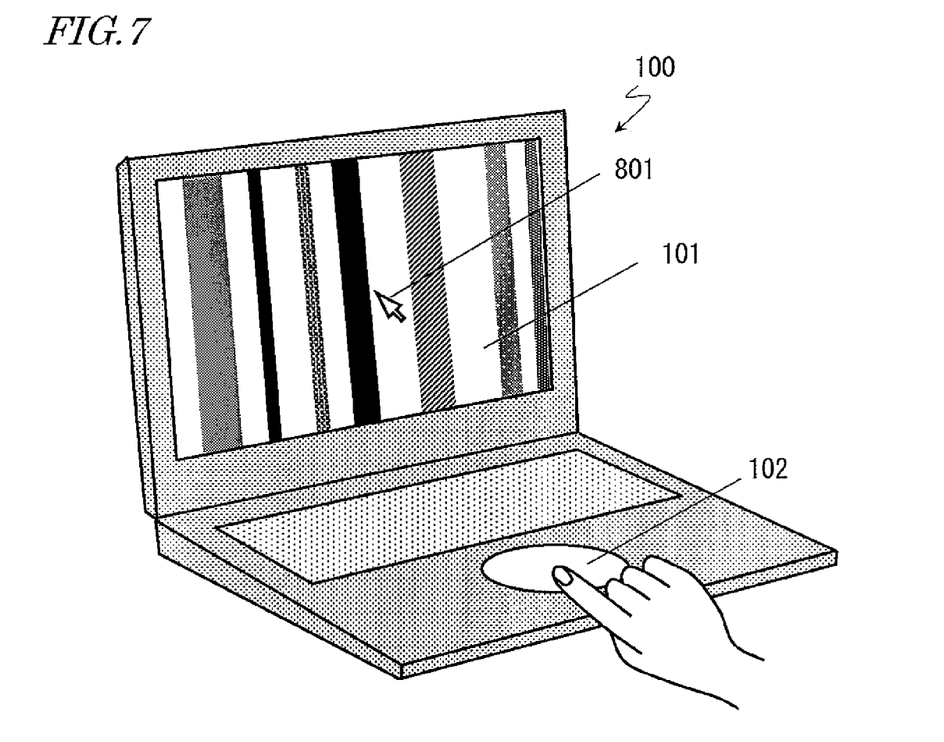
FIG. 7 is an external perspective view of an electronic device according to an embodiment.

FIG. 7 is a plan view showing another configuration example of the electronic device 100. While the vibration is controlled in accordance with the touch position of the user in the example above, a cursor 801 is further displayed separately from the touch position in the example of FIG. 7, wherein the movement of the cursor 801 is varied to further present a rough feel to the user. FIG. 7 shows the electronic device 100 in which the display section 101 and the touch panel 102 are separate units. In this example, the cursor 801 which moves following the touch operation on the touch panel 102 is displayed on the display section 101, while the position of the cursor 801 is associated with the touch position, thereby giving similar effects to those of the example described above. The display control section 303 controls the movement of the cursor 801 displayed on the display section 101 in accordance with the touch position of the user on the touch panel 102. The display control section 303 changes the moving speed of the cursor 801 in accordance with the speed at which the user performs a swiping operation on the touch panel 102 and the spatial frequency in the cursor moving direction of the image displayed at the position where the cursor 801 is moving. For example, the moving speed of the cursor 801 is set to be lower when the spatial frequency is higher than when it is lower. The moving speed of the cursor 801 may be set to be lower when the difference between the highest brightness and the lowest brightness of the image is larger than when it is smaller. When the spatial frequency of the image information at the cursor position is high, or when the contrast is high, the ability of the cursor movement to follow the movement of the touch position may be lowered intentionally so that the cursor follows the finger with a delay, thus representing the degree of roughness of the rough feel at that position.

Note that where the cursor 801 is displayed in a configuration where the touch panel 102 is arranged on the display surface side of the display section 101 as shown in FIG. 1, similar effects can be obtained by controlling the movement of the cursor as described above.

4. Another Embodiment

An embodiment has been described above as an illustration of the technique disclosed in the present application. However, the technique of the present disclosure is not limited thereto, but is also applicable to other embodiments in which changes, replacements, additions, omissions, etc., are made as necessary. Different ones of the elements described in the embodiment described above may be combined together to obtain a new embodiment.

Another embodiment will now be illustrated.

While control sections are individually provided for controlling various components in the embodiment described above, embodiments are not limited thereto. The CPU 302 may serve as the various control sections such as the display control section 303 and the vibration control section 301.

While the embodiment described above is directed to a tablet-type electronic device or a notebook PC-type electronic device, the electronic device 100 is not limited thereto. For example, the electronic device may be any electronic device including a touch panel, such as a mobile telephone, a PDA, a game device, a car navigation, an ATM, etc.

The frequency, the voltage and the number of cycles of the vibration patterns shown in the embodiment described above are merely illustrative, and it may be a different waveform such as a square wave or saw-tooth wave, an intermittent waveform, or a waveform whose frequency or amplitude changes continuously.

While the embodiment above is directed to a capacitive touch panel as the touch panel 102, a touch panel of a resistive type, an optical type, an ultrasonic type, an electromagnetic type, etc., may be used. Moreover, the embodiment is not limited to the touch operation with a finger of the user, and may use an input method using a pen such as a stylus, or the like.

While a tactile sensation is presented by generating vibrations in the embodiment above, the embodiment is not limited thereto. Tactile sensations may be presented by other methods, e.g., a variation of friction using static electricity, a skin stimulation using electric current, and a variation of screen shape using liquid. In addition to presenting a tactile sensation, screen display, sound, light, heat, etc., may be used in combination as necessary.

Note that the operation of the electronic device described above may be implemented by means of hardware or software. A computer program implementing such a control operation is stored, for example, in an internal memory of the CPU 302. Such a computer program may be installed onto the electronic device 100 from a storage medium (an optical disc, a semiconductor memory, etc.) storing the computer program, or may be downloaded via a telecommunications network such as the Internet.

5. Summary

The electronic device 100 according to an embodiment includes the touch panel 102 to be touched by the user, the vibrating section 203 for vibrating the touch panel 102, the vibration control section 301 for controlling the vibration of the vibrating section 203, and the display section 101 for displaying an image. The vibration control section 301 changes the vibration of the vibrating section 203 in accordance with the speed at which the user performs a swiping operation on the touch panel 102 and the spatial frequency in the swiping direction of an image displayed at the position where the user is performing a swiping operation. Thus, it is possible to generate a vibration in accordance with the image displayed on the display section 101. Therefore, it is possible to present, to the user, a tactile sensation in accordance with the image.

The vibration control section 301 may change the vibration amplitude of the vibrating section 203 in accordance with the touch position of the user. Thus, it is possible to correct the variations of vibration across the touch panel 102. Therefore, it is possible to present, to the user, a more realistic tactile sensation.

The vibration control section 301 may change the phase of the drive waveform of the vibrating section 203 in accordance with the touch position of the user. Thus, it is possible to generate a vibration mode of a higher-order mode on the touch panel 102. Therefore, it is possible to generate a uniform vibration across the entire area of the touch panel.

The spatial frequency corresponds to the cycle with which the brightness of the image displayed on the display section 101 changes, for example, and the vibration control section 301 may vary the vibration between high-brightness areas and low-brightness areas of the image. The spatial frequency may correspond to the cycle with which the color of the image displayed on the display section 101 changes, for example, and in such a case, the vibration control section 301 may vary the vibration between areas of the image of different colors. Thus, it is possible to generate a vibration in accordance with the image displayed on the display section 101. Therefore, it is possible to present, to the user, a tactile sensation in accordance with the image.

The range of the image over which the spatial frequency is calculated may be changed in accordance with the swiping speed of the user. In this case, the range of the image over which the spatial frequency is calculated may be set to be larger when the swiping speed of the user is higher than when it is lower, for example. Thus, information of the image in the vicinity of the range of the swiping operation can be reflected in the drive waveform. Therefore, it is possible to present, to the user, a more realistic tactile sensation.

Where the touch position of the user does not change, the vibration control section 301 may not vibrate the vibrating section 203. Thus, since no vibration is generated when the swiping operation is not being performed, it is possible to present a more realistic tactile sensation. For example, by stopping the vibration when the swiping finger stops, it is possible to allow the user to more realistically experience the feel of the object represented by the image.

The electronic device 100 may further include the display control section 303 for controlling the movement of the cursor 801 displayed on the display section 101 in accordance with the touch position of the user. The display control section 303 may change the moving speed of the cursor 801 in accordance with the speed at which the user performs a swiping operation on the touch panel 102 and the spatial frequency in the moving direction of the cursor 801 of the image displayed at the position where the cursor 801 is moving. Thus, it is possible to represent the rough feel of the image by the movement of the cursor 801. Therefore, it is possible to allow the user to feel a realistic tactile sensation.

The moving speed of the cursor 801 may be lower when the spatial frequency is higher than when it is lower. The spatial frequency may correspond to the cycle with which the brightness of the image displayed on the display section 101 changes, and in such a case, the moving speed of the cursor 801 may be lower when the difference between the highest brightness and the lowest brightness of the image is larger than when it is smaller. Thus, it is possible to represent the rough feel of the image by the movement of the cursor 801. Therefore, it is possible to allow the user to feel a realistic tactile sensation.

A computer program for causing the electronic device 100 to perform a vibration operation according to an embodiment causes the CPU 302 of the electronic device 100 to perform the steps of: detecting a touch operation of a user on the touch panel 102; and changing a vibration of the touch panel 102 in accordance with the speed at which the user performs a swiping operation on the touch panel 102 and the spatial frequency in the swiping direction of the image displayed at the position where the user is performing a swiping operation. Thus, it is possible to generate a vibration in accordance with the image displayed on the display section 101. Therefore, it is possible to present, to the user, a tactile sensation in accordance with the image.

Embodiments have been described above for illustrating the technique disclosed herein. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein.

Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The electronic device of the present disclosure can suitably be used as an input device for a portable information terminal device, a computer display, a car navigation device, an ATM, a ticket vending machine, etc., for example.

What is claimed is:

1. An electronic device comprising:
   a panel touched by a user;
   a vibrator that vibrates the panel;
   a vibration controller that controls the vibration of the vibrator; and
   a display that displays an image,
   wherein the vibration controller changes the vibration of the vibrator in accordance with a frequency of modulated wave that is calculated by multiplying a speed at which the user performs a swiping operation on the panel and a spatial frequency of an image as the image varies on different parts of the display in a swiping direction at a position where the user is performing a swiping operation; and
   wherein an area of the image over which the spatial frequency is calculated is set to be larger when the swiping speed of the user is higher than when the swiping speed of the user is lower.

2. The electronic device according to claim 1, wherein the vibration controller changes a vibration amplitude of the vibrator in accordance with a touch position of the user.

3. The electronic device according to claim 1, wherein the vibration controller changes a phase of a drive waveform of the vibrator in accordance with a touch position of the user.

4. The electronic device according to claim 1, wherein:
   the spatial frequency corresponds to a cycle with which a brightness of an image displayed on the display changes; and
   the vibration controller varies the vibration between high-brightness areas and low-brightness areas of the image.

5. The electronic device according to claim 1, wherein:
   the spatial frequency corresponds to a cycle with which a color of an image displayed on the display section changes; and
   the vibration controller varies the vibration between areas of the image of different colors.

6. The electronic device according to claim 1, wherein the vibration controller does not vibrate the vibrator when a touch position of the user does not change.

7. The electronic device according to claim 1, wherein:
   the electronic device further comprises a display control section for controlling a movement of a cursor displayed on the display in accordance with a touch position of the user;
   the display control section changes a moving speed of the cursor in accordance with a speed at which the user performs a swiping operation on the panel and a spatial frequency in a moving direction of the cursor on an image displayed at a position where the cursor is moving.

8. The electronic device according to claim 7, wherein the moving speed of the cursor is lower when the spatial frequency is higher than when the spatial frequency is lower.

9. The electronic device according to claim 7, wherein:
   the spatial frequency corresponds to a cycle with which a brightness of an image displayed on the display section changes; and
   the moving speed of the cursor is lower when a difference between a highest brightness and a lowest brightness of the image is larger than when the difference is smaller.

10. A non-transitory computer readable medium storing a computer program for causing an electronic device to perform a vibration operation, the computer program causing a computer of the electronic device to perform the steps of:
   detecting a touch operation by a user on a panel; and
   changing a vibration of the panel in accordance with a frequency of modulated wave that is calculated by multiplying a speed at which the user performs a swiping operation on the panel and a spatial frequency of an image as the image varies on different parts of the display in a swiping direction at a position where the user is performing a swiping operation;
   wherein an area of the image over which the spatial frequency is calculated is set to be larger when the swiping speed of the user is higher than when the swiping speed of the user is lower.

\* \* \* \* \*